United States Patent [19]

Ueno et al.

[11] Patent Number: 5,506,907
[45] Date of Patent: Apr. 9, 1996

[54] CHANNEL AUDIO SIGNAL ENCODING METHOD

[75] Inventors: Masatoshi Ueno; Shinji Miyamori, both of Tokyo, Japan

[73] Assignee: Sony Corporation, Japan

[21] Appl. No.: 326,318

[22] Filed: Oct. 20, 1994

[30] Foreign Application Priority Data

Oct. 28, 1993 [JP] Japan .................................. 5-270442

[51] Int. Cl.[6] .............................. H04R 5/00; G03B 31/02
[52] U.S. Cl. .................................. 381/18; 381/1; 381/17; 352/27; 352/37
[58] Field of Search ................................ 381/18, 17, 22, 381/23, 24, 63, 66, 119, 21, 19; 352/27, 37

[56] References Cited

U.S. PATENT DOCUMENTS

| | | | |
|---|---|---|---|
| 4,281,688 | 2/1981 | Furner | 381/18 |
| 4,680,796 | 7/1987 | Blackmer et al. | 381/23 |
| 5,027,687 | 7/1991 | Iwamatsu | 381/1 |
| 5,155,510 | 10/1992 | Beard | 352/27 |
| 5,189,703 | 2/1993 | Holman | 381/22 |
| 5,199,075 | 3/1993 | Fosgate | 381/22 |
| 5,327,182 | 7/1994 | Kohut et al. | 352/27 |

FOREIGN PATENT DOCUMENTS

0600677A1 6/1994 European Pat. Off. ........ G03B 31/02

OTHER PUBLICATIONS

"Multi–Channel Stereophonic Sound System with and Without Accompanying Picture," Draft New Recommendation (Doc. 10/11), CCIR Study Groups, Period 1990–1994, Document 10/BL/3–E, 20 May 1992.

*Primary Examiner*—Forester W. Isen
*Assistant Examiner*—Xu Mei
*Attorney, Agent, or Firm*—Limbach & Limbach; Charles P. Sammut

[57] ABSTRACT

An encoding method and apparatus for audio signals for generating ten-channel audio signals from audio signals of a left channel, a left center channel, a center channel, a right center channel, a right channel, a surround left channel, a surround right channel and a sub-woofer channel, totalling at eight channels. The encoded method includes the steps of combining the center channel, left center channel and the right center channel to form a combined center channel, combining the left channel and the left center channel to form a combined left channel, combining the right channel and the right center channel to form a combined right channel, combining the left channel, left center channel, center channel, right center channel and the surround left channel to form a mixed left channel, combining the right channel, right center channel, center channel, left center channel and the surround right channel to form a mixed right channel, and generating the left channel, combined left channel, combined center channel, combined right channel, right channel, surround left channel, surround right channel, sub-woofer channel, mixed left channel and the mixed right channel, totalling at 10 channels, of audio signals as channel audio signals. The decoding method and apparatus for decoding encoded signals encoded with the above encoding method and apparatus are also disclosed.

5 Claims, 12 Drawing Sheets

CHANNEL AUDIO SIGNAL ENCODING METHOD

BACKGROUND OF THE INVENTION

This invention relates to a method for generating channel audio signals for generating multi-channel audio signals employed for recording on a recording medium or transmission over a transmission channel in a stereophonic system or a multi-sound system for a motion picture film projecting system, video tape recorder or a video disc player.

The recent tendency in audio equipment is towards signal digitalization and a digital audio system has become popular not only as professional equipment but also in consumer equipment. Above all, the multi-channel system is now in widespread use in digital audio equipment, for example, in equipment handling 8- channel digital audio signals.

Among the equipment handling the eight-channel digital audio signals, there is, for example, a motion picture film projection system. In addition, audio signals or speech signals of plural channels, such as four to eight channels, are handled preferentially in a stereophonic or multi-sound system of a high- definition television, video tape recorder or a video disc player.

Above all, in the motion picture film projection system handling such eight-channel audio signals, it is a customary practice to record digital audio signals of, for example, left, left center, center, right center, right, surround left, surround right and sub-woofer channels, thus totalling eight channels, on the motion picture film. However, when recording the digital audio signals of the eight channels, since it is difficult to provide an area on the motion picture film in which to record as many as eight channels of the linear quantized 16-bit digital audio data, with the sampling frequency being 44.1 kHz, as employed in the so-called compact disc (CD), the audio data is compressed before recording. The technique of recording plural channel audio data as compressed digital patterns on the digital pattern recording region of the motion picture film is described in the present Assignee's co-pending U.S. patent Application Ser. No. 158,767 (European Patent Application published as No. 0600677A1 on Jun. 8, 1994).

The above-mentioned eight channels, thus recorded on the motion picture film, are associated with left, left center, center, right center, right and sub-woofer speakers, arranged on the side of a screen, and surround left and surround right speakers, arranged on the left and right sides of the spectator's seats. On the screen, there is projected a picture reproduced from the picture recording region of the motion picture film by a projector.

The multi-channel digital audio equipment is being widespread for consumer use is developed with existing media.

In order for the multi-channel digital audio equipment to be widespread in consumer use, it is desirable that multi-channel digital audio data be reproduced in existing or prospective channel systems, such as monaural, stereo or so-called 3-2 systems, in addition to an environment capable of reproducing all of the multiple channels. This means that reliable channel down-conversion is required for effective reproduction of data having three or more channels in a stereophonic sound field.

If, for example, recording data is not compressed data and can be outputted without decoding or the like operations, it is possible to down-convert the number of channels by combining plural channels.

However, if the eight channel data is to be reproduced with the monaural system, at least seven combining operations are required for down-converting the eight channels to a sole channel, thus resulting in an inefficient operation and in an complicated processing circuit.

On the other hand, with the multi-channel audio signals, the tendency is to compress data prior to recording. Such data compression affects the number of decoders for expansion by the down-converting method. For down-converting from the eight channels to two stereo channels, the eight channel compressed signals are all expanded into non-compressed data and combined among plural channels. Thus, eight decoders are required for two-channel stereo reproduction.

For monaural reproduction, many decoders are also required, which is equivalent to that for the eight channels, meaning inefficiency in the device construction. The playback system for down-converting the multichannel audio channels to a stereo or monaural channel is expensive and hence is unsuitable for consumer devices.

OBJECT AND SUMMARY OF THE INVENTION

In view of the above-described status of the art, it is an object of the present invention to provide a method for generating channel audio signals which permits facilitated and inexpensive down-conversion of multiple channels to monaural or stereo channels.

According to the present invention, there is provided an encoding method for audio signals for generating ten-channel audio signals from audio signals of a left channel, a left center channel, a center channel, a right center channel, a right channel, a surround left channel, a surround right channel and a sub-woofer channel, totalling at eight channels. The method comprises the steps of combining the center channel, left center channel and the right center channel to form a combined center channel, combining the left channel and the left center channel to form a combined left channel, combining the right channel and the right center channel to form a combined right channel, combining the left channel, left center channel, center channel, right center channel and the surround left channel to form a mixed left channel, combining the right channel, right center channel, center channel, left center channel and the surround right channel to form a mixed right channel, and generating the left channel, combined left channel, combined center channel, combined right channel, right channel, surround left channel, surround right channel, sub-woofer channel, mixed left channel and the mixed right channel, totalling at 10 channels, of audio signals as channel audio signals, for recording on the recording medium or transmission over the transmission channel. There is also provided an encoding device for audio signals for carrying out the above encoding method.

According to the present invention, there is also provided a decoding method for decoding audio signals in which, during reproduction from a recording medium having recorded thereon the audio signals encoded from eight channels to ten channels, wherein the audio signals are down-converted to a pre-set number of channels less than eight. These ten channels of the audio signals comprise a left channel, a right channel, a surround left channel, a surround right channel, a sub-woofer channel, a combined center channel combined from a center channel, a left center channel and a right center channel, a combined left channel combined from the left channel and the left center channel, a combined right channel combined from the right channel and the right center channel, a mixed left channel combined from the left channel, left center channel, center channel, right center channel and the surround left channel, and a mixed right channel combined from the right channel, right center channel, center channel, left center channel and the surround right channel. The decoding method comprises multiplying each of the pre-set number of channels with a pre-set constant number times signals of a necessary minimum number of channels, and summing the resulting channel signals multiplied with the preset constant numbers. There is also provided a decoding device for audio signals for carrying out the above encoding method. With the encoding method and device of the present invention, the eight-channel audio signals are combined as indicated in an encoding table given hereinbelow and thereby converted into ten-channel multi-channel audio signals which are recorded or transmitted. With the decoding method and apparatus of the present invention, when the ten-channel audio signals, received or reproduced, are decoded by the decoding device, certain ones of the multi-channel audio signals are selected and separated as indicated in a table for decoding given hereinbelow so as to be combined in order to realize down-conversion into various channel systems, such as monaural or stereo channel systems, as shown in a table for various channel systems as given hereinbelow. Above all, by generating the Lmix channel and the Rmix channel in the encoding device, only two decoders for the recorded data suffice if the decoding device is a stereo reproducing device.

Since the multiple channels may be prepared by a simple combining operation, the circuit designing may be facilitated. In addition, the number of channels increased by the recording and transmitting system of the present invention is only two for the eight channels, thus producing only little increase in the recording area or in the frequency band for transmission.

According to the present invention, audio signals of a combined center channel, combined from the center channel, left center channel and the right center channel, a combined left channel, combined from the left channel and the left center channel, a combined right channel, combined from the right channel and the right center channel, a mixed left channel combined from the left channel, left center channel, center channel, right center channel and surround left channel, a mixed right channel combined from the right channel, right center channel, center channel, left center channel and surround right channel, the left channel, the right channel, the surround left channel, the surround right channel and the sub-woofer channel, totalling at ten channels, are generated. When down-converting these multi-channel audio signals to a plurality of, such as 16, channel systems, such as monaural or stereo channel systems, signals of a necessary minimum number of channels are multiplied with pre-set constant numbers and summed together for each of output channels of the respective channel systems for realizing the down-conversion to the respective channel systems easily and at low cost.

DETAILED DESCRIPTION OF THE PREFERRED EMBODIMENTS

Figure 1:
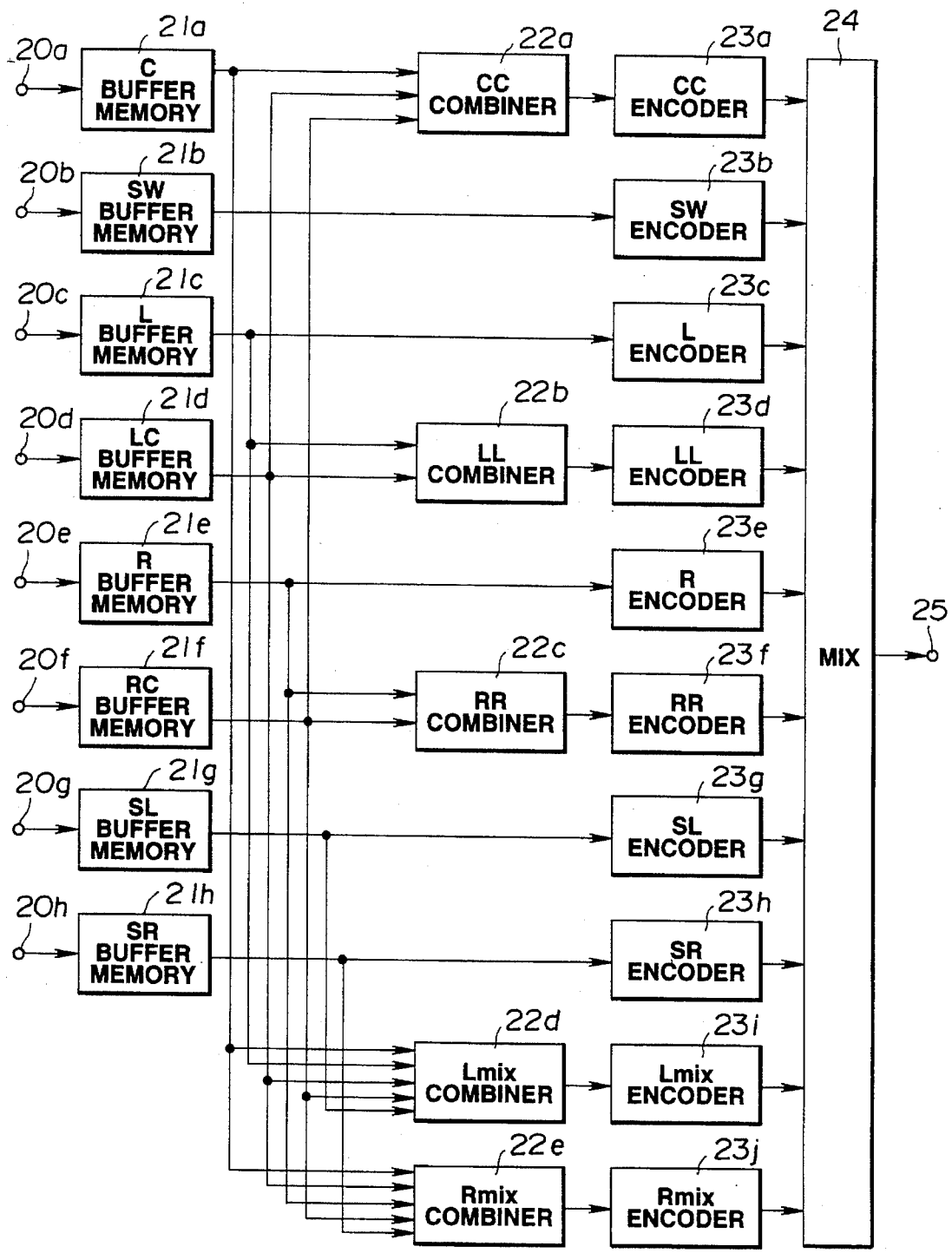
FIG. 1 is a block circuit diagram showing an arrangement of an encoding device for executing the channel audio signal generating method according to the present invention.

Referring to the drawings, preferred embodiments of the present invention will be explained in detail.

FIG. 1 shows an arrangement of a multichannel audio signal recording device (audio signal encoder) for executing the channel audio signal generating method according to the present invention. Taking into account the application to the consumer equipment of the eight channels recorded on the motion picture film, the number of channels for input data employed for recording in the present embodiment is set to eight, namely seven channels and a sub-woofer channel.

Figure 2:
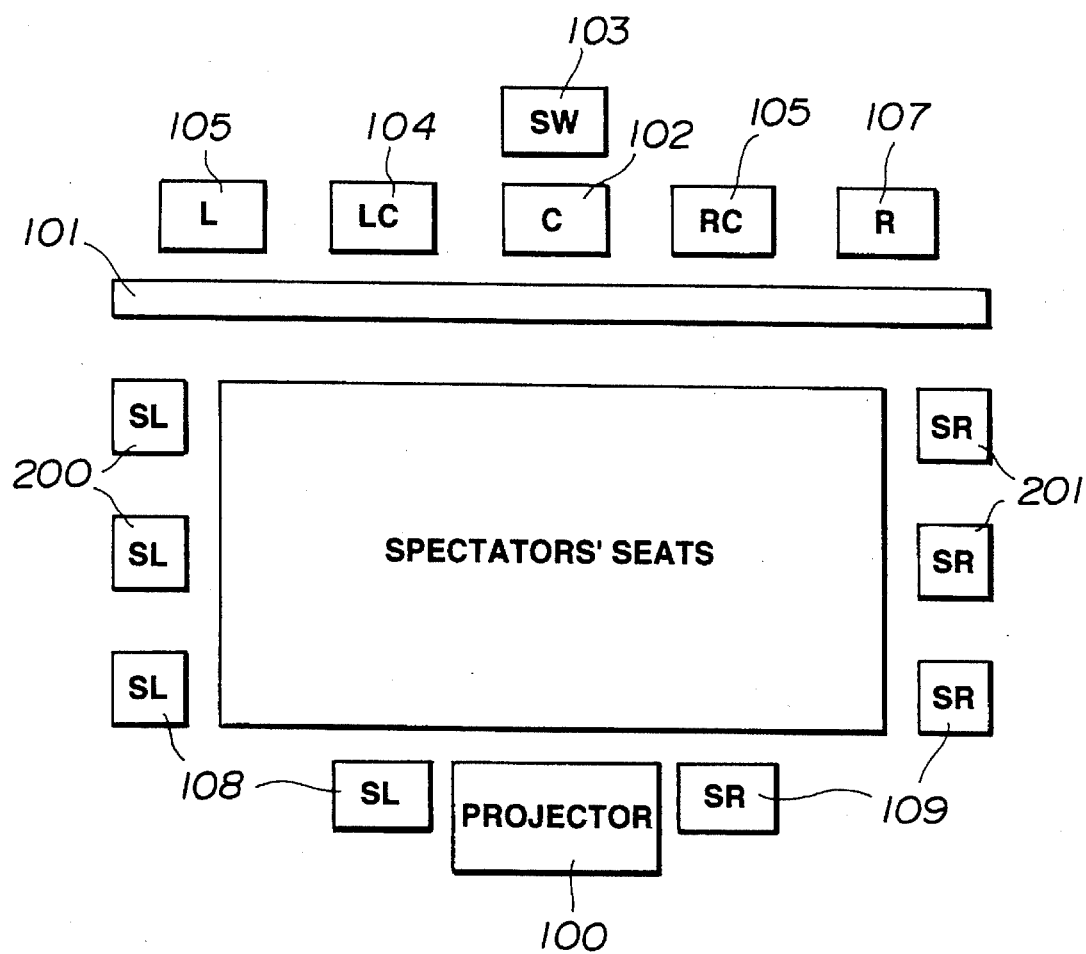
FIG. 2 schematically shows a speaker arrangement for an eight-channel digital surround system as a first specified example of the channel format.

The eight-channel construction corresponds to the digital surround system having plural speakers arranged as shown for example in FIG. 2. These channels are a center (C) channel, a sub-woofer (SW) channel, a left (L) channel, a left center (LC) channel, a right (R) channel, a right center (RC) channel, a left surround (SL) channel and a right-surround (SR) channel.

In FIG. 2, the eight channels recorded on the motion picture film are associated with a left speaker 106, a left center speaker 104, a center speaker 102, a right center speaker 105, right speaker 107 and a sub-woofer speaker 103, arranged on the side of a screen 101, and surround left speakers 108, 200 and surround right speakers 109, 201, arranged surrounding the spectator's seats. On the screen 101, there is projected a picture reproduced from the picture recording region of the motion picture film by a projector 100. The center speaker 102 is arranged at a mid position on the side of the screen 101 for outputting the playback sound by audio data of the center (C) channel, such as the most crucial playback sound, for example, the actor's dialogue. The sub-woofer (SW) speaker 103 outputs the playback sound by the audio data of the sub-woofer (SW) channel. For example, the sub-woofer speaker effectively outputs the sound which is perceived as vibrations, rather than as a low-range sound, such as the sound of explosion. Thus the sub-woofer speaker is effectively employed in many cases for a scene of explosion. The left speaker 106 and the right speaker 107 are arranged on the left-hand and right-hand sides of the screen 101 for outputting the playback sound by audio data of the left (L) channel and the playback sound by audio data of the right (R) channel, respectively, thus exhibiting stereophonic effects. The left center speaker 104 and the right center speaker 105 are arranged between the center speaker 102 and the left speaker 106 and between the center speaker 102 and the right speaker 107 for outputting the playback sound by audio data of the left center (LC) channel and the playback sound by audio data of the right center (RC) channel, respectively, thus assisting in the function of the left speaker 106 and the right speaker 107. In a motion picture theater having a large format screen 101 and capable of holding many visitors, the fixed sound image position feeling tends to become unstable depending on seat positions. However, by addition of the left center speaker 104 and the right center speaker 105, a more realistic fixed sound image position feeling may be created more effectively. In addition, the surround left speakers 108, 200 and the surround right speakers 109, 201 are arranged for encircling the spectator's seats for outputting the playback sound by audio data of the surround left (SL) channel and the surround right (SR) channel, respectively, thus producing an impression of the reverberating sound or hand clapping or cheer surrounded by the spectator for creating a more effective three-dimensional sound image.

The above-described eight-channel digital audio data is transformed by an encoder shown for example in FIG. 1 so as to be recorded on a recording medium.

Referring to FIG. 1, eight-channel data supplied via input terminals 20a to 20h are temporarily stored in buffer memories 21a to 21b associated with the respective channels. The buffer memories 21a to 21h are associated with the center (C) channel, sub-woofer (SW) channel, left (L) channel, left center (LC) channel, right (R) channel, right center (RC) channel, surround left (SL) channel and the surround right (SR) channel, respectively.

The audio data of five channels, namely sub-woofer (SW) channel, left (L) channel, right (R) channel, surround left (SL) channel and surround right (SR) channel, are temporarily stored in a sub-woofer (SW) buffer memory 21b for sub-woofer (SW) channel, a left (L) buffer memory 21c for the left (L) channel, a right (R) buffer memory 21e for the right (R) channel, a surround left (SL) buffer memory 21g for the surround left (SL) channel and a surround right (SR) buffer memory 21h for the surround right (SR) channel, respectively among buffer memories 21a to 21h. These five channel audio data are directly routed to and encoded by an SW encoder 23b for the sub-woofer (SW) channel, an L encoder 23c for the left (L) channel, a R encoder 23e for the right (L) channel, a surround left (SL) channel encoder 23g for the surround left (SL) channel and to a surround right (SR) channel encoder 23h for the surround right (SR) channel, respectively.

On the other hand, the audio data of the center (C) buffer memory 21a for the center channel, the left center channel (LC) buffer memory 21d for the left center channel (LC) channel and the right center channel (RC) buffer memory 21f for the right center channel (RC) channel, are temporarily stored in the center (C) buffer memory 21a, in the left center (LC) buffer memory for the left center (LC) channel and in the right center (RC) buffer memory for the left center (RC) channel, among the buffer memories 21a to 21h. They are transmitted to a CC mixer 22a. In addition, the audio data from the left (L) channel from the left (L) buffer memory 21c and the audio data from the left center (LC) channel from the left center (LC) buffer memory 21d are supplied to an LL mixer 22b, while the audio data from the right (R) channel from the left (R) buffer memory 21e and the audio data from the right center (RC) channel from the right center (RC) buffer memory 21f are supplied to an RR mixer 22c.

The combined output channel from the CC mixer 22a, the combined output channel from the LL mixer 22b and the combined output channel from the RR mixer 22c are called as the CC channel (combined center channel), LL channel (combined left channel) and the RR channel (combined right channel), respectively. The combined outputs of the CC mixer 22a, LL mixer 22b and the RR mixer 22c are directed to a CC encoder 23a for the CC channel, an LL encoder 23d for the LL channel and to a RR encoder 23f for the CC channel, associated therewith, respectively. That is, the audio data of the center (C) channel, left center (LC) channel and the right center (RC) channel, are combined by the CC mixer 22a so as to be encoded by the associated CC encoder 23a. The audio data of the left (L) channel and the left center (LC) channel are combined by the LL mixer 22b so as to be encoded by the associated LL encoder 23d. The audio data of the right (R) channel and the right center (RC) channel are combined by the RR mixer 22c so as to be encoded by the associated RR encoder 23f.

The audio data of the center (C) of the center (C) channel, left (L) channel, left center (LC) channel, right center (RC) channel and the surround left (SL) channel, are temporarily stored in the center (C) buffer memory 21a, left (L) buffer memory 21c, left center (LC) buffer memory 21d, right center (RC) buffer memory 21f and in the surround left (SL) buffer memory 21g, among the buffer memories 21a to 21h, respectively. They are also transmitted to an L-mix mixer 22d. The audio data of the center (C) channel, left center (LC) channel, right (R) channel and the surround right (SR) channel are temporarily stored in the center (C) buffer memory 21a, left center (LC) buffer memory 21d, right (R) buffer memory 21e, right center (RC) buffer memory 21f and in the surround right (SR) buffer memory 21h, respectively. They are also transmitted to an R-mix mixer 22e. The combined output channel from the Lmix mixer 22d and the combined output channel from the Rmix mixer 22e are called as a left mixed (Lmix) channel and a right mixed (Lmix) channel, respectively. The combined output from the Lmix mixer 22d is encoded by an associated Lmix encoder 23i for the Lmix channel, while the combined output from the Rmix mixer 22e is encoded by an associated Rmix encoder 23j.

The encoded output data of the encoders 23a to 23j are supplied to a multiplexer 24 for mixing so as to generate multi-channel data at an output terminal 25. Based on the format of the recording medium, the multiplexer 24 mixes the 8-channel audio data, while transmitting the remaining two channel audio data together to the next stage. The contents of the format is not discussed herein because it is not the subject of the present embodiment.

In the combining operation by the mixers 22a to 22e, the ratio employed for encoding has been selected as shown in the following Table 1, with the use of additive nodes for the analog or digital audio data, based upon the proposal of Comite Consultatif International des Radio Communications (CCIR). If such ratio is employed for the combining operation, it becomes possible with the combining operation to achieve ideal effects during down-conversion as will be explained subsequently.

TABLE 1

| Encoding | L | LC | C | RC | R | SL | SR | SW |
| --- | --- | --- | --- | --- | --- | --- | --- | --- |
| CC |  | 0.7 | 1.0 | 0.7 |  |  |  |  |
| L | 1.0 |  |  |  |  |  |  |  |
| LL | 1.0 | 0.7 |  |  |  |  |  |  |
| RR |  |  |  | 0.7 | 1.0 |  |  |  |
| R |  |  |  |  | 1.0 |  |  |  |
| SL |  |  |  |  |  | 1.0 |  |  |
| SR |  |  |  |  |  |  | 1.0 |  |
| SW |  |  |  |  |  |  |  | 1.0 |
| Lmix | 1.0 | 0.9 | 0.7 | 0.3 |  | 0.7 |  |  |
| Rmix |  | 0.3 | 0.7 | 0.9 | 1.0 |  | 0.7 |  |

Referring to the above Table 1, the CC channel combines the audio data with the above ratio of the left center (LC) channel, center (C) channel and the right center (RC) channel set to 0.7, 1.0 and 0.7, respectively. In a similar manner, the LL channel combines the audio data with the above ratio of the left (L) channel and the left center (LC) channel set to 1.0 and 0.7, respectively. The RR channel combines the audio data with the above ratio of the right center (RC) channel and the right (R) channel set to 0.7 and 1.0, respectively. The Lmix channel combines the audio data with the above ratio of the left (L) channel, left center (LC) channel, center (C) channel, right center (RC) channel and the surround left (SL) channel set to 1.0, 0.9, 0.7, 0.3 and 0.7, respectively. The Rmix channel combines the audio data with the above ratio of the left center (LC) channel, center (C) channel, right center (RC) channel, right (R) channel and the surround right (SR) channel set to 0.3, 0.7, 0.9, 1.0 and 0.7, respectively.

Figure 3:
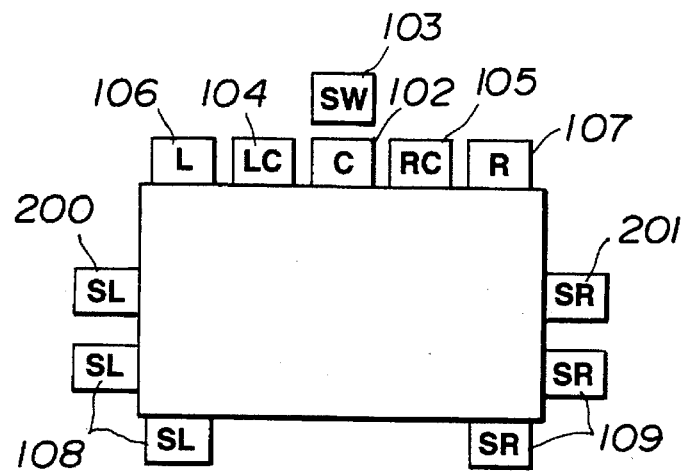
FIG. 3 is a schematic views showing a sound field environment of the first specified example of the channel format.

Turning now to the sound field in which the audio data is to be reproduced by the speakers, second to eighth examples of channel format environments may be conceived as shown schematically in FIGS. 4 to 10 in addition to the eight-channel environment as a first channel format example shown in FIG. 2 and in a simplified form in FIG. 3, if the sound field is to be produced in a consumer equipment. In the present embodiment, the conversion table for each mixer is formulated in order to permit facilitated conversion into audio data providing the sound field suitable for any of these environments. The decoding device, including the decoders and the mixers of plural channel data in the sound field environments shown. in FIGS. 3 to 10, is hereinafter explained. In FIGS. 3 to 11, the speakers of the same type as those shown in FIG. 2 are denoted by corresponding reference numerals.

As shown in the encoding device (recording device) shown in FIG. 1, recording in the sub-woofer (SW) channel is made independently of the recording in the remaining channels. This independent relation can be also applied to the decoding device. Whether the sub-woofer (SW) channel may be employed for reproduction can be determined without dependency upon the using condition of the remaining channels. Although the sub-woofer (SW) channel is employed in any of the channel environments shown in FIGS. 3 to 10, the decoding device remains unchanged except that the decoder for the sub-woofer channel is not used.

The first example shown in FIG. 3 is a channel format in which audio data is to be reproduced in an environment, such as a theater, shown in FIG. 2, and employs eight channels, namely the center (C) channel, sub-woofer (SW) channel, left center (LC) channel, left (L) channel, right center (RC) channel, right (R) channel, surround left (SL) channel and the surround right (SR) channel.

Figure 11:
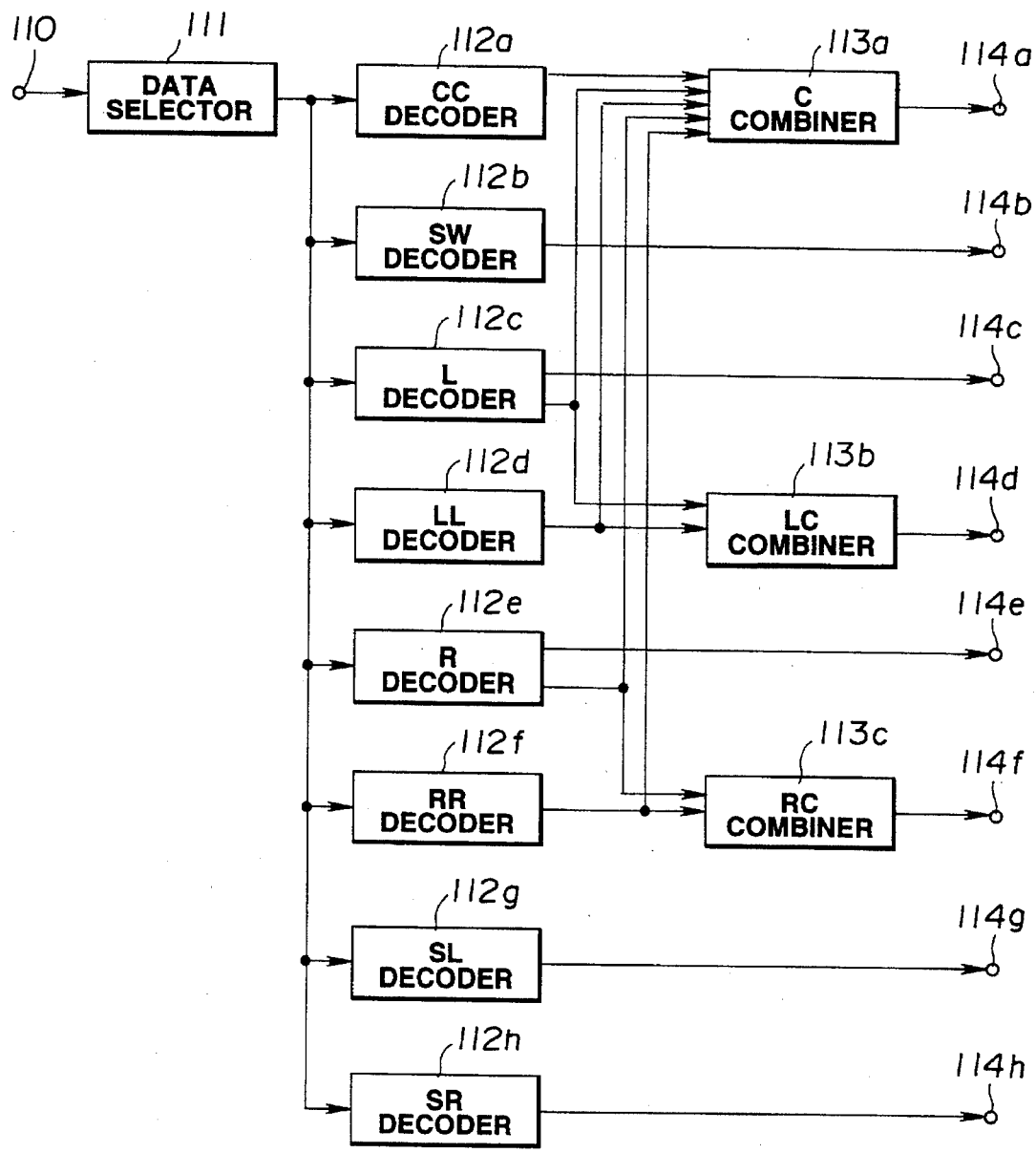
FIGS. 11 to 18 are block circuit diagrams showing arrangements of decoders for down-conversion associated with the sound field environments of the first to eighth specified examples of the channel format, respectively.

The decoding device for replay, shown in FIG. 3, is constructed as shown for example in FIG. 11.

Referring to FIG. 11, the multi-channel data, comprised of data of the CC channel, sub-woofer (SW) channel, left (L) channel, LL channel, right (R) channel, RR channel, surround left (SL) channel, surround right (SR) channel, Lmix channel and the Rmix channel, supplied at an input terminal 110 (10-channel data from the encoder of FIG. 1) enter a data selector 111 whereby only eight channels, namely the CC channel, sub-woofer (SW) channel, left (L) channel, LL channel, right (R) channel, RR channel, surround left (SL) channel and the surround right (SR) channel, which are to be in use, are selected and separated so as to be supplied to eight decoders 112a to 112h associated with the encoders 23a to 23h, shown in FIG. 1, for decoding, respectively.

The decoded data from the SW decoder 112b, L decoder 112c, R decoder 112e, SL decoder 112g and the SR decoder 112h, among these eight decoders 112a to 112h, are directly outputted at associated output terminals 114b, 114c, 114e, 114g and 114h, as audio data of the sub-woofer (SW) channel, left (L) channel, right (R) channel, surround left (SL) channel and the surround right (SR) channel, respectively.

On the other hand, the decoded data of the CC decoder 112a, LL decoder 112c, R decoder 112e and the RR decoder 112f, are also directed to the C mixer 113a and combined together therein. A combined output of the C mixer 113a is outputted at an output terminal 114a as decoded audio data of the center (C) channel.

The decoded data from the L decoder 112c and the LL decoder 112d is also directed to and combined together in the LC mixer 113b. A combined output of the LC mixer 113b is outputted at an output terminal 114d as decoded audio data of the left center (LC) channel.

The decoded data from the R decoder 112e and the RR decoder 112f is also directed to and combined together in the RC mixer 113c. A combined output of the RC mixer 113c is outputted at an output terminal 114f as decoded audio data of the right center (RC) channel.

Outputs of the output terminals 114a to 114h of FIG. 11 are transmitted to associated speakers of FIG. 3 in order to make possible the audio output suitable to the channel format shown in FIG. 3.

Figure 4:
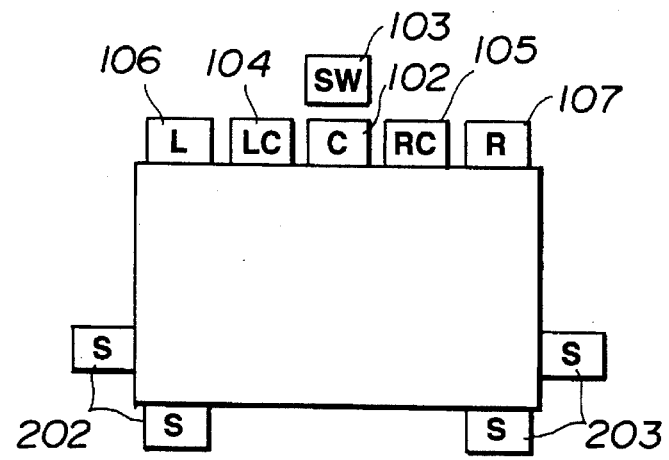
FIGS. 4 to 10 are schematic views showing sound field environments of second to eighth specified examples of the channel format, respectively.

The second embodiment shown in FIG. 4 is of a channel format in which only one surround channel (S channel) of the environment shown in FIG. 3 is employed instead of a left surround channel and a right surround channel, and thus employs seven channels, namely a center (C) channel, a sub-woofer (SW) channel, a left center (LC) channel, a right center (RC) channel, a left (L) channel, a right center (RC) channel and the S channel.

Figure 12:
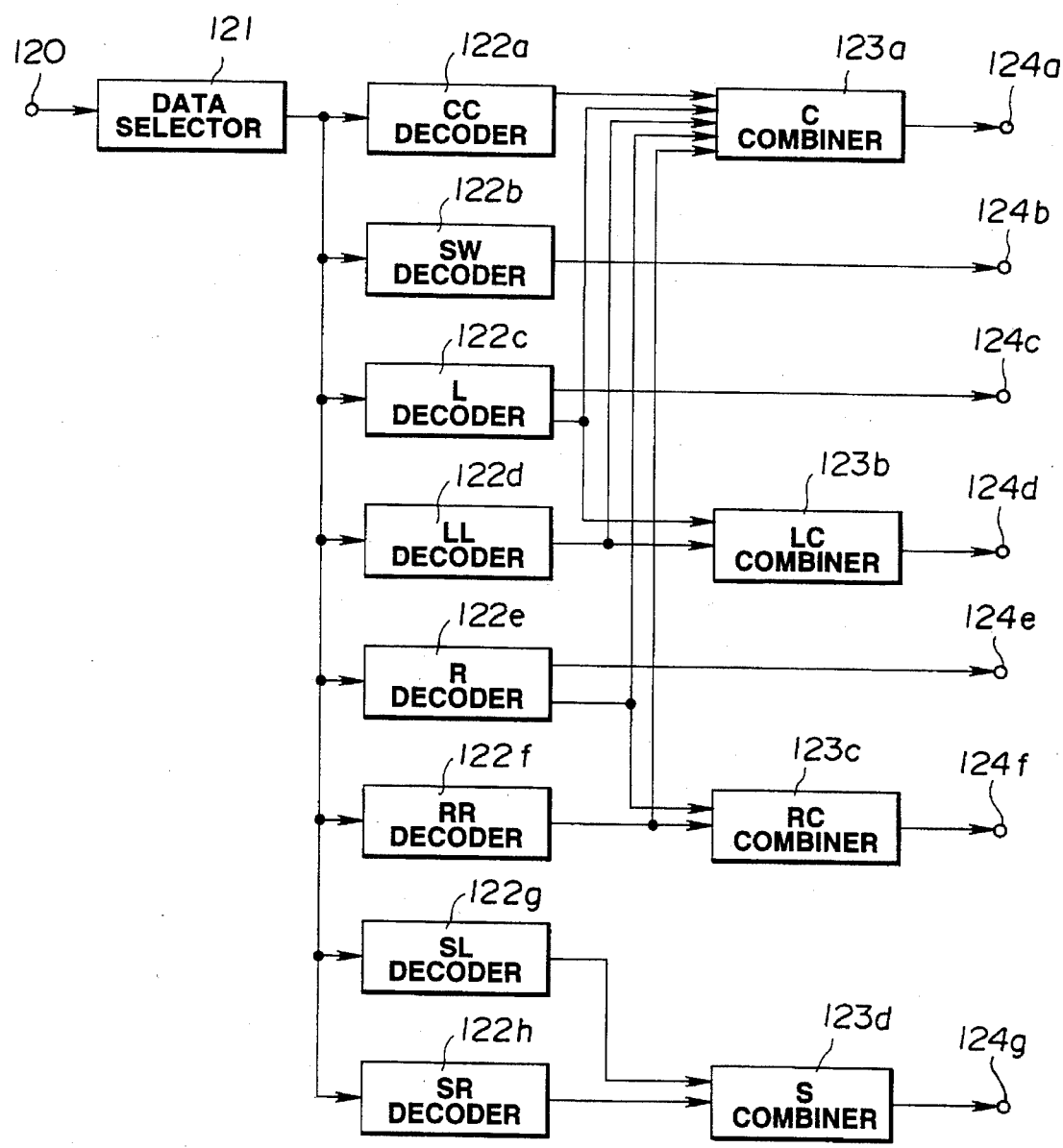

The decoding device for the embodiment shown in FIG. 4 is constructed as shown for example in FIG. 12.

Referring to FIG. 12, multi-channel data similar to those shown in FIG. 11, supplied via an input terminal 120, that is ten-channel data from the encoding device of FIG. 1, is transmitted to a data selector 121 which then selects and separates only the channels in use, namely the CC channel, sub-woofer (SW) channel, left (L) channel, LL channel, right (R) channel, RR channel, surround left (SL) channel and the surround right (SR) channel. The selected channels are transmitted to eight decoders 122a to 122h, corresponding to the encoders 23a to 23h shown in FIG. 1, for decoding, respectively.

Decoded data from the SW decoder 122b, L decoder 122c and the R decoder 122e, among these eight decoders 122a to 122h, are directly outputted at associated output terminals 124b, 124c and 124e, respectively, as sub-woofer (SW) channel data, left (L) channel data and right (R) channel data, respectively.

On the other hand, decoded data from the CC decoder 122a, L decoder 122c, LL decoder 122d, R decoder 122e and the RR decoder 122f are also transmitted to and combined together in a C mixer 123a. Thus a combined output of the C mixer 123a is outputted at an output terminal 124a as decoded data of the center (C) channel.

The decoded data from the L decoder 122c and the LL decoder 122d are also transmitted to and combined together in a LC mixer 123b. That is, the combined output of the LC mixer 123b is outputted at an output terminal 124d as decoded data of the left center (LC) channel.

The decoded data from the R decoder 122e and the RR decoder 122f are also transmitted to and combined together in an RC mixer 123c. That is, the combined output of the RC mixer 123c is outputted at an output terminal 124f as decoded data of the right center (RC) channel.

With the decoding device of FIG. 12, the decoded data from the SL decoder 122g an the SR decoder 122h are also transmitted to and combined together in the S mixer 123d. That is, the combined output of the S mixer 123d is outputted at an output terminal 124g as audio data of the above-mentioned S channel combined from the decoded left and right surround channels. Outputs at the output terminals 124a to 124g shown in FIG. 12 are transmitted to associated speakers of FIG. 4 to enable audio outputs suited to the channel format shown in FIG. 4. The S channel audio signals are transmitted to the speakers 202 and 203 of FIG. 4.

Figure 5:
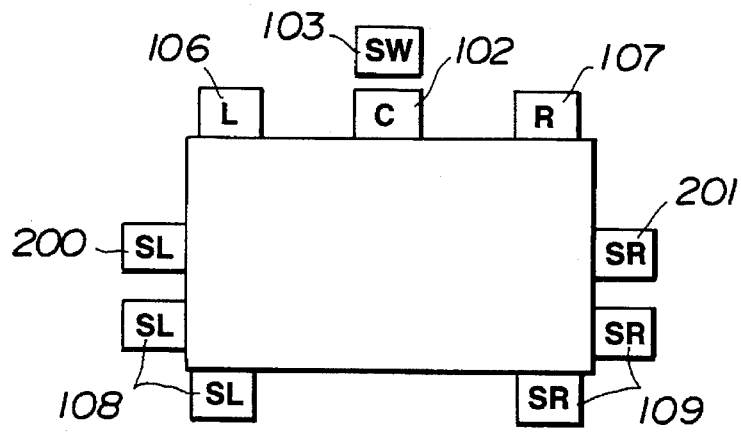

The third example, shown in FIG. 5, is of the channel format in which the number of the front side channels of the sound field environment shown in FIG. 3 is decreased from the six channels inclusive of the sub-woofer (SW) channel to four channels in which the left center (LC) channel and the right center (RC) channel are deleted from the channel format on the front side shown in FIG. 3. The channel format example shown in FIG. 5 is employed in, for example, the so-called MPEG for encoding the moving picture. In the channel format example of FIG. 5, six channels are employed, namely the center (C) channel, sub-woofer (SW) channel, left (L) channel, right (R) channel, surround left (SL) channel and the surround right (SR) channel.

Figure 13:
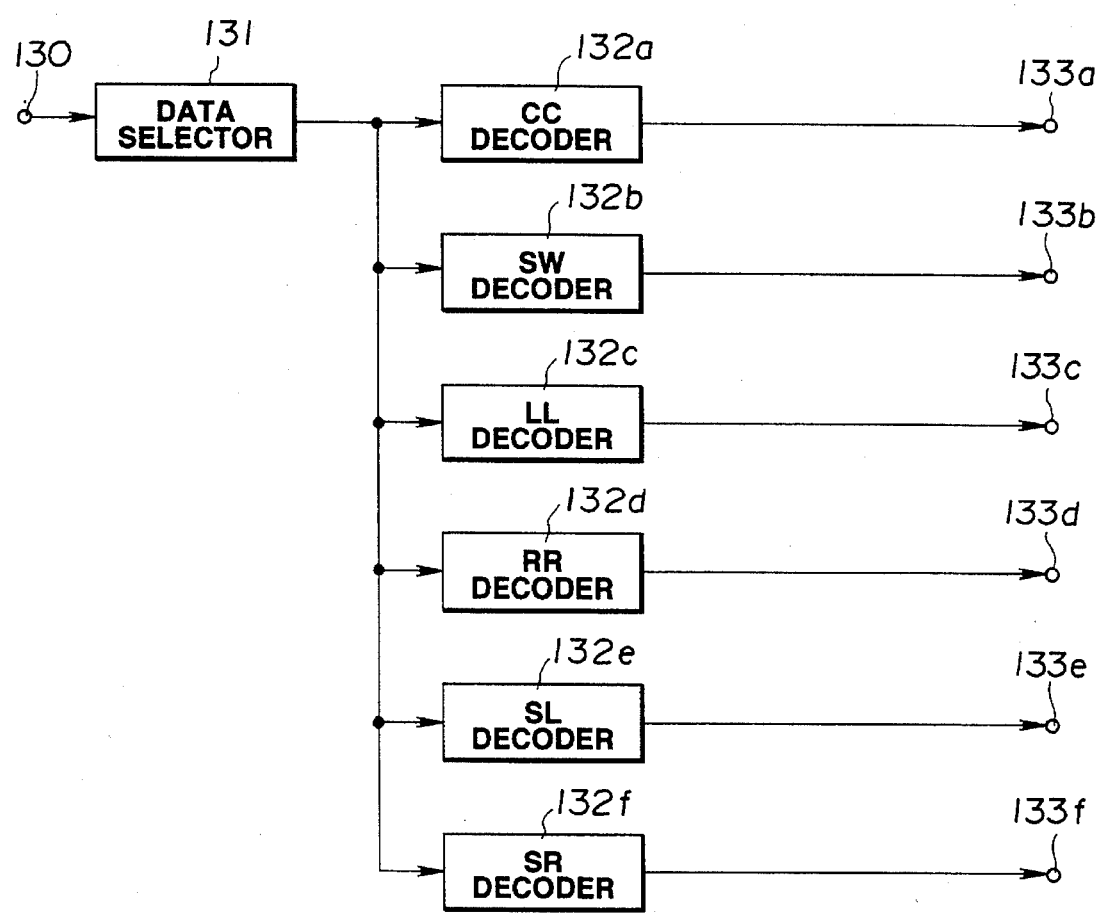

The decoding device for the embodiment shown in FIG. 5 is constructed as shown for example in FIG. 13.

Referring to FIG. 13, multi-channel data supplied via an input terminal 130, that is ten-channel data from the encoding device of FIG. 1, is directed to a data selector 131 which selects and separates only data of six channels in use, namely the CC channel, sub-woofer (SW) channel, LL channel, RR channel, surround left (SL) channel and the surround right (SR) channel. These separated data are directed to and encoded by a CC decoder 132a, a SW decoder 132b, an LL decoder 132c, an RR decoder 132d, and SL decoder 132d, an SL decoder 132e and an SR decoder 132f, respectively, associated with the CC encoder 23a, SW encoder 23b, LL encoder 23b, RR encoder 23f, SL encoder 23g and the SR encoder 23h, respectively.

Decoded data of these six decoders 132a to 132f are transmitted to associated output terminals 133a to 133f, respectively. The decoded data from the CC decoder 132a, the SW decoder 132b, LL decoder 132c, RR decoder 132d, SL decoder 132e and the SR decoder 132f, are outputted as the center (C) channel, sub-woofer (SW) channel, left (L) channel, right (R) channel, surround left (SL) channel and as the surround right (SR) channel, respectively. In other words, with the construction shown in FIG. 13, decoded data of the CC channel, LL channel and the RR channel may be employed as decoded data of the center (C) channel, left (L) channel and the right (R) channel, respectively, without having mixers as shown in FIGS. 11 and 12.

Outputs of output terminals 133a to 133f of FIG. 13 are supplied to a speaker of FIG. 5 in order to enable an audio output suited to the channel format shown in FIG. 5.

Figure 6:
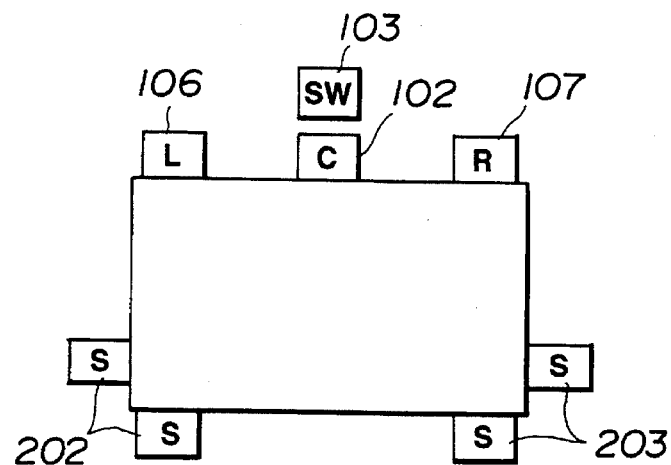

The fourth channel format example is shown in FIG. 6, having the channel format in which the number of the channels of the environment of FIG. 5 for example is decreased from six to five. In other words, the left and right surround channels are unified into one S channel. In the embodiment of FIG. 6, five channels, namely the center (C) channel, sub-woofer (SW) channel, left (L) channel, right (R) channel and the S channels, are employed.

Figure 14:
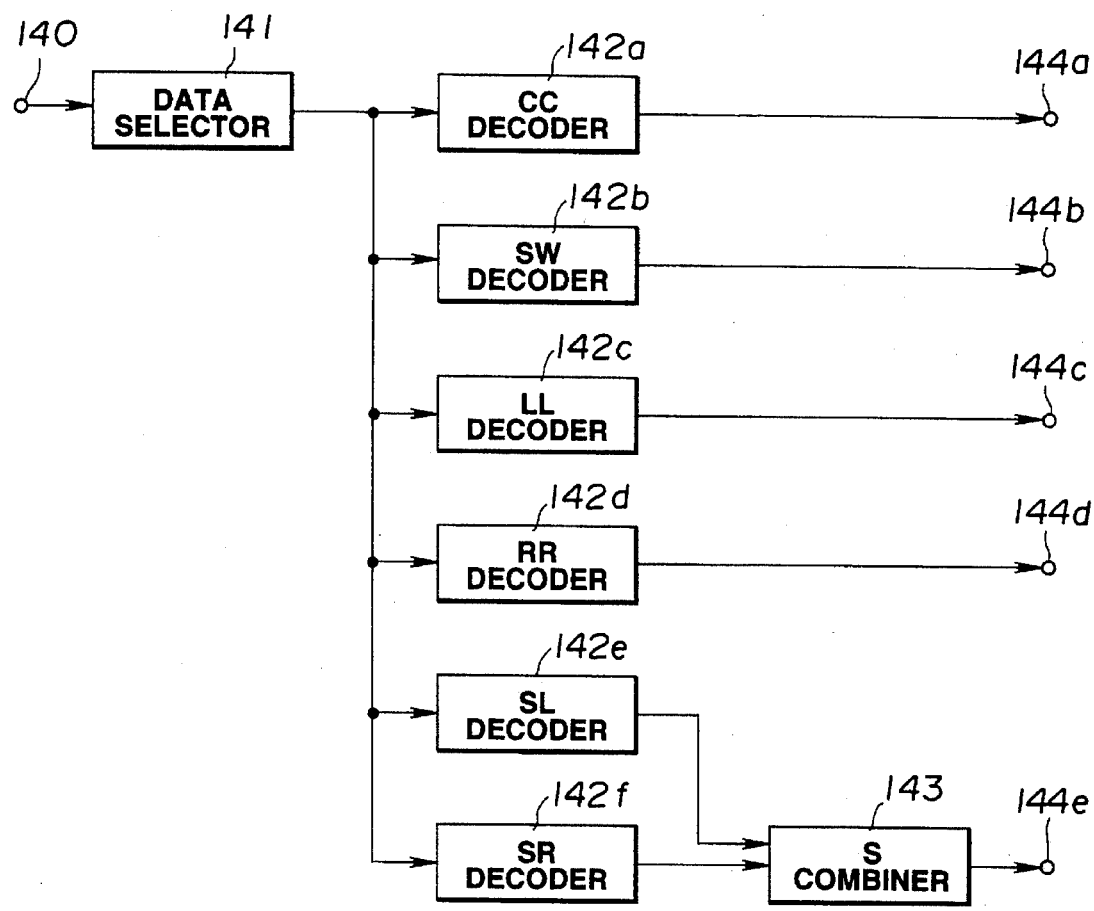

The decoding device for the embodiment shown in FIG. 6 is constructed as shown for example in FIG. 14.

Referring to FIG. 14, ten-channel multi-channel data supplied from the encoding device of FIG. 1 via an input terminal 140, is directed to a data selector 141 which selects and separates only data of six channels in use, namely the CC channel, sub-woofer (SW) channel, LL channel, RR channel, surround left (SL) channel and the surround right (SR) channel. These separated data are supplied to and encoded by a CC decoder 142a, a SW decoder 142b, an LL decoder 142c, an RR decoder 142d, an SL decoder 142e and an SR decoder 142f, respectively, corresponding to the CC encoder 23a, SW encoder 23b, LL encoder 23d, RR encoder 23f, SL encoder 23g and the SR encoder 23h, respectively.

Decoded data out of six decoders 142a to 142d among six decoders are transmitted to associated output terminals 144a to 144d, respectively. The decoded data from the CC decoder 142a, SW decoder 142b, LL decoder 142c and the RR decoder 142d, are outputted as the center (C) channel, sub-woofer (SW) channel, left (L) channel and as the right (R) channel, respectively. In other words, with the construction shown in FIG. 14, decoded data of the CC channel, LL channel and the RR channel may be employed as decoded data of the center (C) channel, left (L) channel and the right (R) channel, respectively, without mixers shown in FIGS. 11 and 12. Outputs of the SL decoder 142e and the SR decoder 142f are combined in an S mixer 143 so as to be outputted as decoded S channel data at an output terminal 144e.

It becomes possible to generate audio output suitable for the channel format shown in FIG. 6 by supplying the output terminal 144a to 144e in FIG. 14 to associated speakers in FIG. 14.

Figure 7:
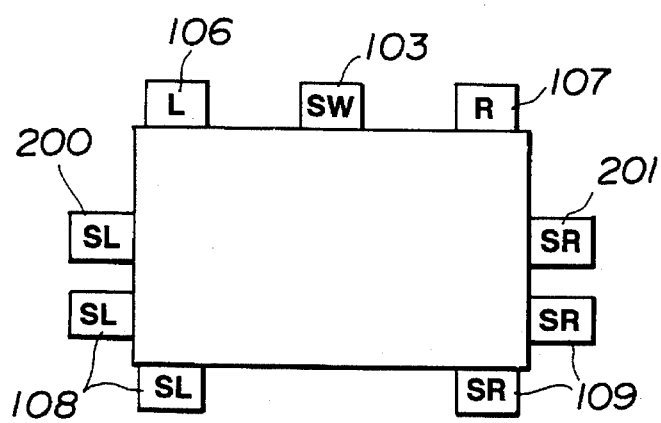

The fifth embodiment is shown in FIG. 7 having a channel format in which the number of the front-side channels of the environment of FIG. 5, for example, is decreased to three channels. Though the sub-woofer (SW) channel is left over, the center (C) channel is deleted from the channel format of FIG. 5. In the embodiment of FIG. 7, five channels are employed, namely the sub-woofer (SW) channel, left (L) channel, right (R) channel, surround left (SL) channel and the surround right (SR) channels.

Figure 15:
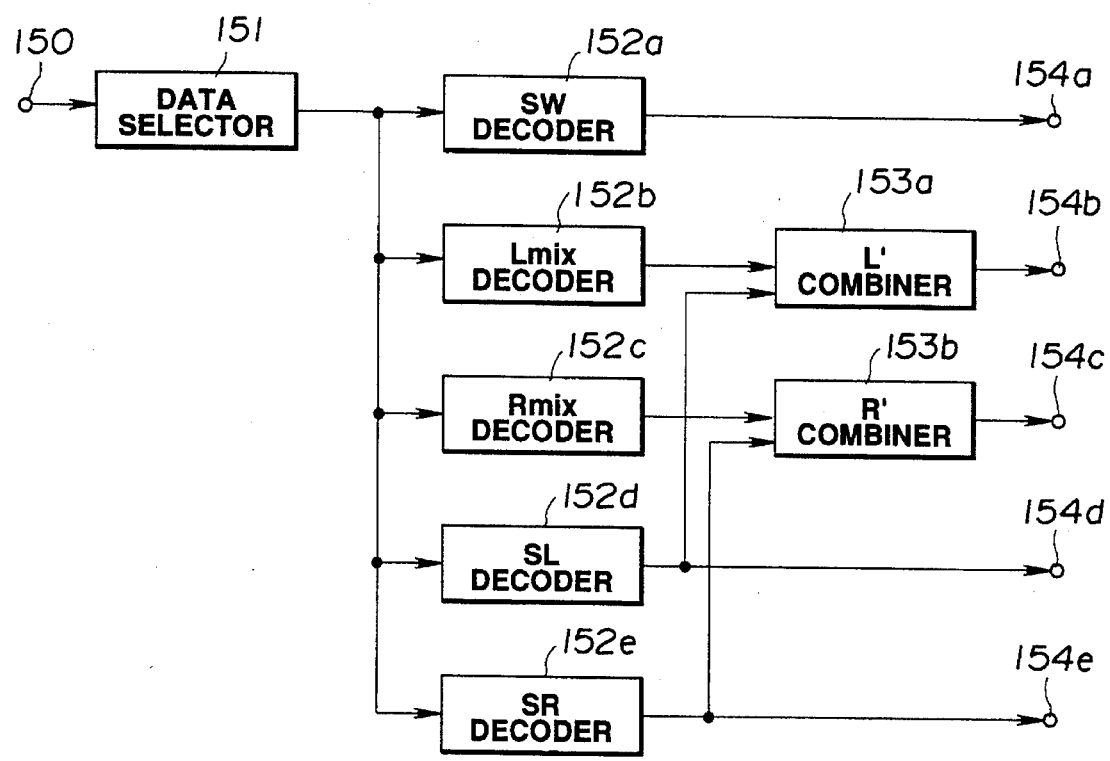

The decoding device for the channel format example shown in FIG. 7 is constructed as shown for example in FIG. 15.

Referring to FIG. 15, multi-channel data supplied via an input terminal 150, that is ten-channel data from the encoding device of FIG. 1, is supplied to a data selector 151 which selects and separates only data of five channels in use, namely the sub-woofer (SW) channel, Lmix channel, Rmix channel, surround left (SL) channel and the surround right (SR) channel. These separated data are supplied to and decoded by a SW decoder 152a, an Lmix decoder 152b, an Rmix decoder 152c, an SL decoder 152d, and an SR decoder 152d, respectively, corresponding to the SW encoder 23b, Lmix encoder 23i, Rmix encoder 23i, SL encoder 23g and the SR encoder 23h, respectively.

The decoded data from the decoders 152a, 152d and 152e, among these five decoders, are supplied to associated output terminals 154a, 154d and 154e so as to generate an output data of the sub-woofer (SW), surround left (SL) and surround right (SR) channels, respectively. On the other hand, the decoded data from the Lmix decoder 152b is combined by a mixer 153a with decoded data from the SL decoder 152d so as to generate an output at a terminal 154b as left (L') channel decoded data, while the decoded data from the Rmix decoder 152c is combined by a mixer 153b with decoded data from the SR decoder 152e so as to generate an output at a terminal 154c as right (R') channel decoded data.

The outputs of the output terminal 154a to 154e in FIG. 15 are supplied to associated speakers in FIG. 7 so as to enable audio output suited to the channel format shown in FIG. 7.

Figure 8:
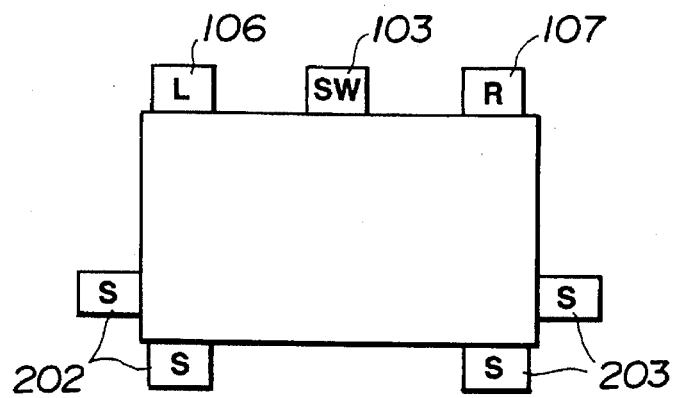

The sixth example is shown in FIG. 8, having a channel format in which the number of the front channels of the environment of FIG. 6, for example, is decreased from four to three channels. Though the sub-woofer (SW) channel is left over, the center (C) channel is deleted from the channel format of FIG. 6. In the channel format example of FIG. 8, four channels are employed, namely the sub-woofer (SW) channel, left (L) channel, right (R) channel and the S channel.

Figure 16:
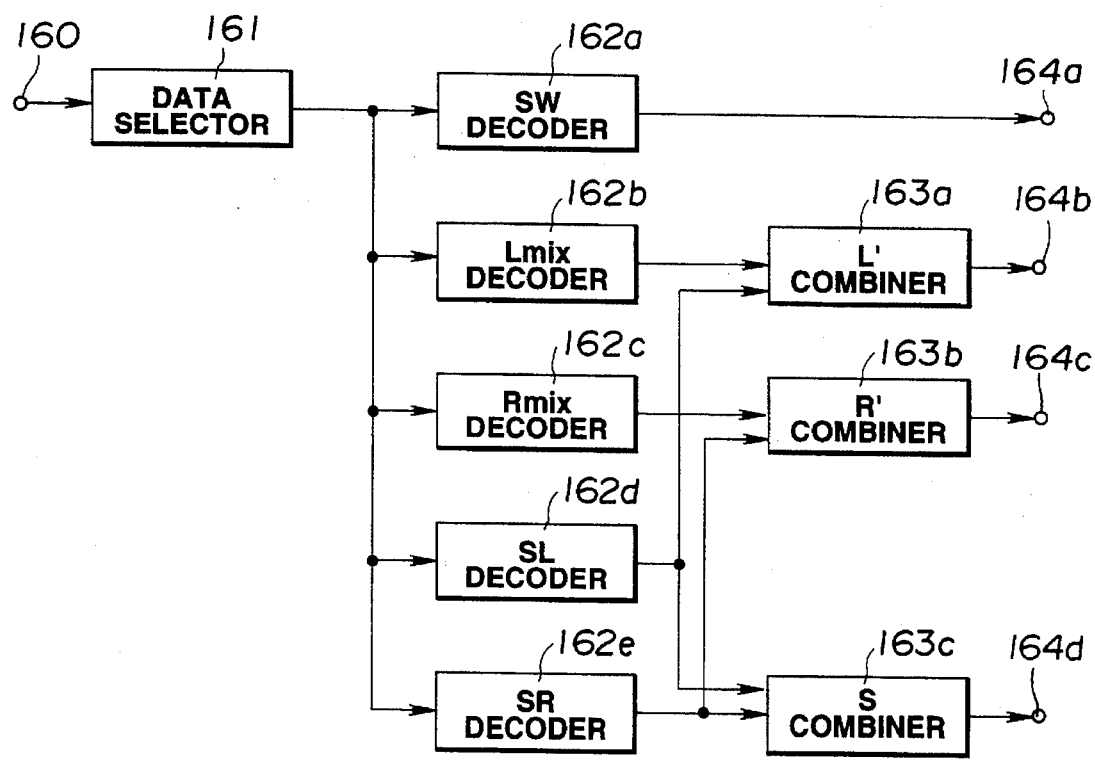

The decoding device for the channel format example shown in FIG. 8 is constructed as shown for example in FIG. 16.

Referring to FIG. 16, multi-channel data supplied via an input terminal 160, that is ten-channel data from the encoding device of FIG. 1, is supplied to a data selector 161 which selects and separates only data of five channels in use, namely the sub-woofer (SW) channel, Lmix channel, Rmix channel, surround left (SL) channel and the surround right (SR) channel. These separated data are supplied to and decoded by a SW decoder 162a, an Lmix decoder 162b, an Rmix decoder 162c, an SL decoder 162d, and SR decoder 162d, respectively, corresponding to the SW encoder 23b, Lmix encoder 23i, Rmix encoder 23j, SL encoder 23g and the SR encoder 23h, respectively.

The decoded data from the SW decoder 162a, among these five decoders, is supplied to an associated output terminal 164a as the sub-woofer (SW) channel. The decoded data from the Lmix decoder 162b is combined by an L' mixer 163a with the decoded data from the SL decoder 162d to form decoded data of the left (L') channel which is outputted at an output terminal 164b. The decoded data from the R/mix decoder 162c is combined by an R' mixer 163b with the decoded data from the SR decoder 162e to form decoded data of the right (R') channel which is outputted at an output terminal 164c. On the other hand, the decoded data from the SL decoder 162d and the decoded data from the SR decoder 162e are combined together by an S mixer 163c to form decoded audio data of the S channel which is outputted at an output terminal 164d.

It becomes possible to generate audio output suitable for the channel format shown in FIG. 6 by supplying the output terminal 164a to 164d in FIG. 16 to associated speakers in FIG. 8.

Figure 9:
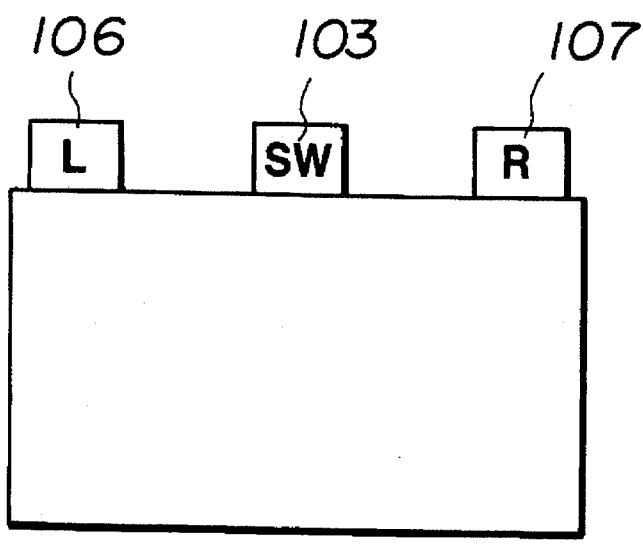

The seventh embodiment is shown in FIG. 9, having the channel format in which the surround channel (S channel) is deleted from the environment shown for example in FIG. 8. In other words, a sub-woofer (SW) channel is added to the usual stereo system. The embodiment of FIG. 9 employs three channels, namely the sub-woofer (SW) channel, left (L) channel and the right (R) channel. Above all, with the consumer equipment, down-conversion is required to this format or to the format without the sub-woofer (SW) channel.

Figure 17:
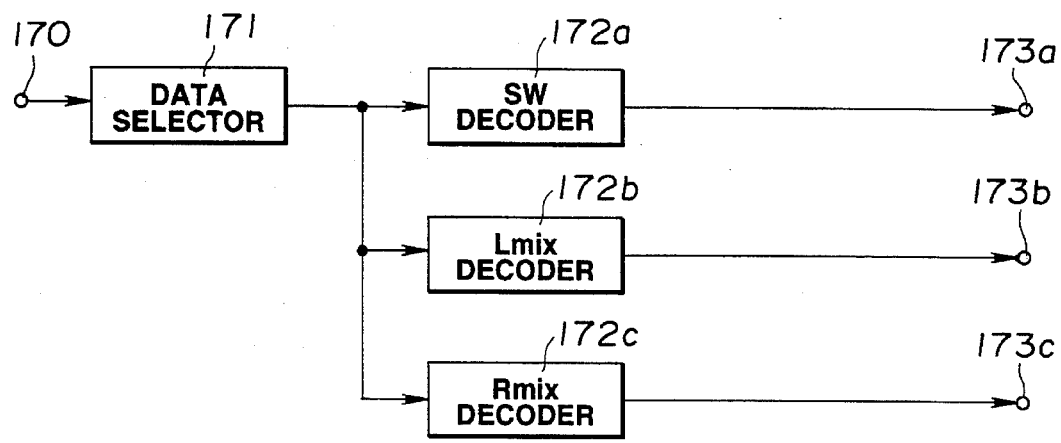

The decoding device for the embodiment shown in FIG. 9 is constructed as shown for example in FIG. 17.

In this figure, multi-channel data supplied via an input terminal 170, that is the ten-channel data from the encoding device of FIG. 1, are supplied to a data selector 171 which selects and separates only data of the three channels in use, that is the sub-woofer (SW) channel, Lmix channel and the Rmix channel. The selected data is supplied to a SW decoder 172a, a Lmix decoder 172b and a Rmix decoder 172c, corresponding to the SW encoder 23b, Lmix encoder 23i and Rmix encoder 23j of FIG. 1, respectively.

The decoded data from the SW decoder 172a, among these three decoders, is supplied as the sub-woofer (SW) channel to an associated output terminal 173a, while the decoded data from the Lmix decoder 172b is outputted as decoded data of the left (L) channel at an output terminal 173b. The decoded data from the Rmix decoder 172c is outputted as decoded data of the right (R) channel at an output terminal 173c. In the construction shown in FIG. 17, the decode data of the Lmix channel may be utilized as the left (L) channel data, without the mixer, while the decode data of the Rmix channel may be utilized as the right (R) channel data.

It becomes possible to generate audio output suitable for the channel format shown in FIG. 9 by supplying the output terminals 173a to 173c of FIG. 17 to associated speakers of FIG. 9.

Figure 10:
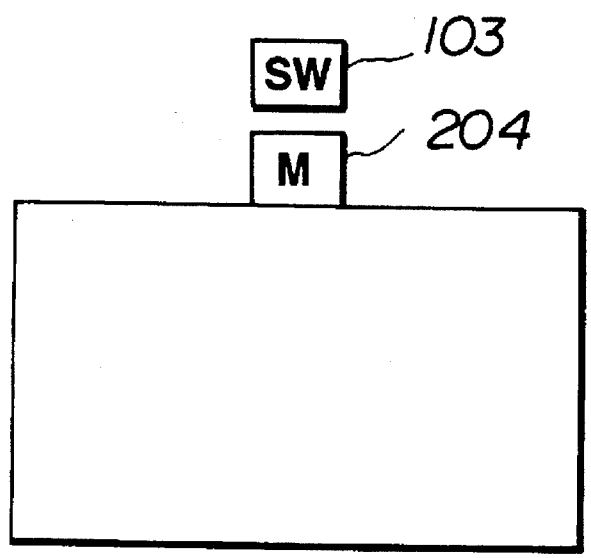

The eighth embodiment is shown in FIG. 10, having the channel format in which the number of channels is decreased to two channels from the three channels of the front side of the environment shown in FIG. 9, so that the sub-woofer (SW) channel is left over, left (L) and right (R) channels are deleted and a monaural (M) channel is annexed to the front side of the environment of FIG. 9. In other words, the sub-woofer (SW) channel is added to the monaural (M) Channel. In the environment of FIG. 10, the sub-woofer (SW) channel and the monaural (M) channel are employed.

Figure 18:
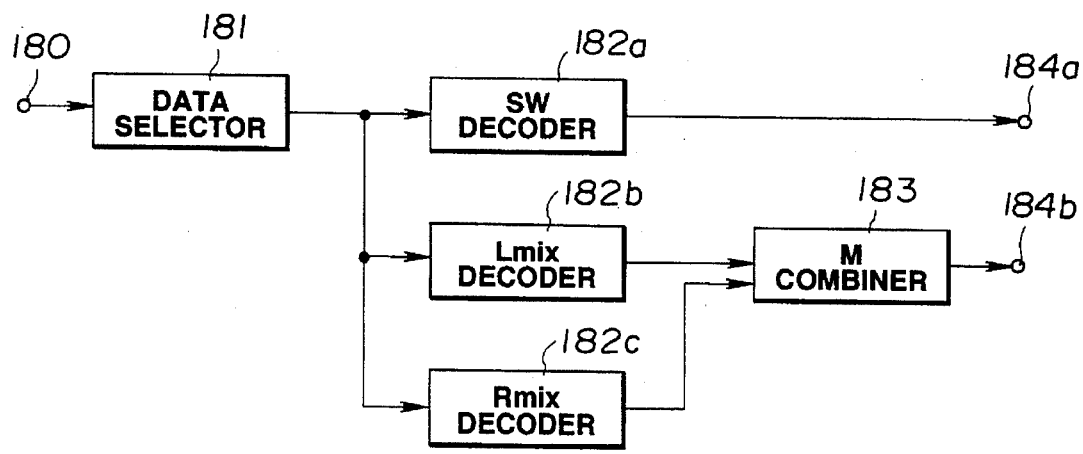

The decoding device for the embodiment shown in FIG. 10 is constructed as shown for example in FIG. 18.

In this figure, multi-channel data supplied via an input terminal 180, that is the ten-channel data from the encoding device of FIG. 1, are directed to a data selector 181 which selects and separates only data of the three channels in use. They are the sub-woofer (SW) channel, Lmix channel and the Rmix channel. The selected data is supplied to a SW decoder 182a, a Lmix decoder 182b and to a Rmix decoder 182c, corresponding to the SW encoder 23b, Lmix encoder 23i and the Rmix encoder 23j of FIG. 1, respectively.

The decoded data from the SW decoder 182a, among these three decoders, is supplied to the sub-woofer (SW) channel to an associated output terminal 184a. On the other hand, the decoded data from the Lmix decoder 182b and that from the Rmix decoder 182c are combined together by an M mixer 183 so as to generate an output audio data of the monaural (M) channel audio data at an output terminal 184b.

The outputs of the output terminals 184a and 184b of FIG. 18 are supplied to associated speakers of FIG. 10 so as to enable audio output suitable for the channel format of FIG. 10.

When the relation shown for example in Table 1 is employed for the combining operation in the encoding device of FIG. 1, the relation shown in Table 2 should be employed for the combining operation in the decoding device in order to output the data. In this manner, ideal effects can be achieved in the down-conversion.

TABLE 2

| decoding | L | LL | CC | RR | R | SL | SR | L mix | R mix | SW |
|---|---|---|---|---|---|---|---|---|---|---|
| L | 1.0 | | | | | | | | | |
| LC | −1.4 | 1.4 | | | | | | | | |
| C | 1.0 | −1.0 | 1.0 | −1.0 | 1.0 | | | | | |
| RC | | | | 1.4 | −1.4 | | | | | |
| R | | | | | 1.0 | | | | | |
| L' | | | | | | −0.7 | | 1.0 | | |
| R' | | | | | | | −0.7 | | 1.0 | |
| Lmix | | | | | | | | 1.0 | | |
| Rmix | | | | | | | | | 1.0 | |
| SW | | | | | | | | | | 1.0 |
| SL | | | | | | 1.0 | | | | |
| SR | | | | | | | 1.0 | | | |
| S | | | | | | 0.7 | 0.7 | | | |
| M | | | | | | | | 0.7 | 0.7 | |

Referring to the above Table 2, the left center (LC) channel combines the audio data with the above ratio of the left (L) channel and the LL channel set to −1.4 and 1.4, respectively, for the combining operation during decoding. In a similar manner, the center (C) channel combines the audio data with the above ratio of the left (L) channel, LL channel, CC channel, RR channel and the right (R) channel set to 1.0, −1.0, 1.0, −1.0 and 1.0, respectively, the RC channel combines the audio data with the above ratio of the RR channel and the right (R) channel set to 1.4 and −1.4, respectively, the L' channel combines the audio data with the above ratio of the surround left (SL) channel and the Lmix channel set to −0.7 and 1.0, respectively, the R' channel combines the audio data with the above ratio of the surround right (SR) channel and the Rmix channel set to −0.7 and 1.0, the S channel combines the audio data with the above ratio of the surround left (SL) channel and the surround right (SR) channel set to 0.7 and 0.7, respectively, and the monaural (M) channel combines the audio data with the above ratio of the monaural (M) channel and the Rmix channel set to 0.7 and 0.7, respectively.

With the use of the above-described encoding and decoding devices, eight channel data can be down-converted for 16 types of channel systems, such as monaural or stereo systems, such as so-called 3-2 system or the 8-channel audio system, by a combination of decoders equal at most to the number of the output channels plus one with four mixers at most. In particular, the only decoders equal to the number of the playback channels are many enough for the most popular stereo system or the so-called 3-2 system which seems to become more popular in near future. Accordingly, the present devices are suitable for use in consumer equipment.

TABLE 3

| Types | Front Channel | Surround Channel | Sub Woofer Channel | Total Channel | Decoder | Mixer |
|---|---|---|---|---|---|---|
| Format 1 | 5 | 2 | 1 | 8 | 8 | 3 |
| Format 2 | 5 | 2 | 0 | 7 | 7 | 3 |
| Format 3 | 5 | 1 | 1 | 7 | 8 | 4 |
| Format 4 | 5 | 1 | 0 | 6 | 7 | 4 |
| Format 5 | 3 | 2 | 1 | 6 | 6 | 0 |
| Format 6 | 3 | 2 | 0 | 5 | | 0 |
| Format 7 | 3 | 1 | 1 | 5 | 6 | 1 |
| Format 8 | 3 | 1 | 0 | 4 | 5 | 1 |
| Format 9 | 2 | | 1 | 5 | 5 | 2 |
| Format 10 | 2 | 2 | 0 | 4 | 4 | 2 |
| Format 11 | 2 | 1 | 1 | 4 | 5 | 3 |
| Format 12 | 2 | 1 | 0 | 3 | 4 | 3 |
| Format 13 | 2 | 0 | 1 | 3 | 3 | 0 |
| Format 14 | 2 | 0 | 0 | 2 | 2 | 0 |
| Format 15 | 1 | 0 | 1 | 2 | 3 | 1 |
| Format 16 | 1 | 0 | 0 | 1 | 2 | 1 |

The above-mentioned sixteen channel systems may be enumerated by the channel systems shown in the above Table 3. With the channel system 1 comprised of five channels of the front side, two channels for the surround channels and one sub-woofer channel, totalling eight channels, the decoding device for down-converting the ten channel multi-channel audio signals may be implemented by the combination of eight decoders and three mixers. Similarly, with the channel system 2 comprised of five channels of the front side and two channels for the surround channels, totalling seven channels, such decoding device may be implemented by the combination of seven decoders and three mixers. With the channel system 3 comprised of five channels of the front side, one channel for the surround channel and one sub-woofer channel, totalling seven channels, the decoding device may be implemented by the combination of eight decoders and four mixers. With the channel system 4 comprised of five channels on the front side and one surround channel, totalling six channels, the decoding device may be implemented by the combination of seven decoders and four mixers. With the channel system 5 comprised of three channels on the front side, two surround channels and one sub-woofer channel, totalling six channels, the decoding device may be implemented by six decoders. With the channel system 6 comprised of three channels on the front side and two surround channels, totalling five channels, the decoding device may be implemented by five decoders. With the channel system 7 comprised of three channels on the front side, one surround channel and one sub-woofer channel, totalling five channels, the decoding device may be implemented by the combination of six decoders and one mixer. With the channel system 8 comprised of three channels on the front side and one surround channel, totalling four channels, the decoding device may be implemented by the combination of five decoders and one mixer. With the channel system 9 comprised of two channels on the front side, two surround channels and one sub-woofer channel, totalling five channels, the decoding device may be implemented by the combination of five decoders and two mixers. With the channel system 10 comprised of two channels on the front side and two surround channels, the decoding device may be implemented by the combination of four decoders and two mixers. With the channel system 11 comprised of two channels on the front side, one surround channel and one sub-woofer channel, totalling four channels, the decoding device may be implemented by the combination of five decoders and three mixers. With the channel system 12 comprised of two channels on the front side and one surround channel, totalling three channels, the decoding device may be implemented by the combination of four decoders and three mixers. With the channel system 13 comprised of two channels on the front side and one sub-woofer channel, totalling three channels, the decoding device may be implemented by three decoders. With the channel system 14 comprised only of two channels on the front side, the decoding device may be implemented by two decoders. With the channel system 15 comprised of one channel on the front side and one sub-woofer channel, totalling two channels, the decoding device may be implemented by the combination of three decoders and one mixer. Finally, with the channel system 16 comprised only of one channel on the front side, the decoding device may be implemented by the combination of two decoders and one mixer.

Meanwhile, when recording encoded data performed by the above-mentioned encoding device, digital data of the respective channels are recorded in the state in which the digital data of the respective channels have been converted by the encoders. A variety of encoding methods may be employed in the encoder. Since the total number of recording channels is ten with the present embodiment, it is most effective to compress data using suitable encoding systems. If, for example, the compression method of compressing the data size to about one-fifth of the original size, the data mixed in the encoding device is equal in size to the two-channel data, so that the data may be recorded on the recording medium on consumer digital equipment, such as compact disc (CD), digital audio tape (DAT) or an optical video disc. Among the compressing methods of compressing the data to about one-fifth of the original data size, there is a method of dividing audio signals into plural bands and orthogonally transforming the signals of the respective bands into frequency components which are then compressed and encoded by adaptive bit allocation taking advantage of psychoacoustic characteristics of the human auditory sense.

Although the foregoing description has been made of recording of the ten-channel multi-channel audio signals on a recording medium, it is also possible to transmit, broadcast or telecast ten-channel multi-channel audio signals and to receive them by way of performing the decoding and down-conversion as described above.

It is noted that the audio signals may also comprise various sound signal, such as music, speech or acoustic sounds.

What is claimed is:

1. An encoding method for audio signals for generating ten-channel audio signals from audio signals of a left channel, a left center channel, a center channel, a right center channel, a right channel, a surround left channel, a surround right channel and a sub-woofer channel, totalling at eight channels, comprising the steps of combining the center channel, left center channel and the right center channel to form a combined center channel, combining the left channel and the left center channel to form a combined left channel, combining the right channel and the right center channel to form a combined right channel, combining the left channel, left center channel, center channel, right center channel and the surround left channel to form a mixed left channel, combining the right channel, right center channel, center channel, left center channel and the surround right channel to form a mixed right channel, and generating the left channel, combined left channel, combined center channel, combined right channel, right channel, surround left channel, surround right channel, sub-woofer channel, mixed left channel and the mixed right channel, totalling at 10 channels, of audio signals as channel audio signals.

2. An encoding device for audio signals for generating ten-channel audio signals from audio signals of a left channel, a left center channel, a center channel, a right center channel, a right channel, a surround left channel, a surround right channel and a sub-woofer channel, totalling at eight channels, comprising means for combining the center channel, left center channel and the right center channel to form a combined center channel, means for combining the left channel and the left center channel to form a combined left channel, means for combining the right channel and the right center channel to form a combined right channel, means for combining the left channel, left center channel, center channel, right center channel and the surround left channel to form a mixed left channel, means for combining the right channel, right center channel, center channel, left center channel and the surround right channel to form a mixed right channel, and means for generating the left channel, combined left channel, combined center channel, combined right channel, right channel, surround left channel, surround right channel, sub-woofer channel, mixed left channel and the mixed right channel, totalling at 10 channels, of audio signals as channel audio signals.

3. A recording medium having ten-channel audio signals recorded thereon, said ten-channel audio signals comprising a left channel, a right channel, a surround left channel, a surround right channel, a sub-woofer channel, a combined center channel combined from a center channel, a left center channel and a right center channel, a combined left channel combined from the left channel and the left center channel, a combined right channel combined from the right channel and the right center channel, a mixed left channel combined from the left channel, left center channel, center channel, right center channel and the surround left channel, and a mixed right channel combined from the right channel, right center channel, center channel, left center channel and the surround right channel.

4. A decoding method for decoding audio signals in which, during reproduction from a recording medium having recorded thereon the audio signals encoded from eight channels to ten channels, said audio signals are down-converted to a pre-set number of channels not more than eight, said ten channels of the audio signals being a left channel, a right channel, a surround left channel, a surround right channel, a sub-woofer channel, a combined center channel combined from a center channel, a left center channel and a right center channel, a combined left channel combined from the left channel and the left center channel, a combined right channel combined from the right channel and the right center channel, a mixed left channel combined from the left channel, left center channel, center channel, right center channel and the surround left channel, and a mixed right channel combined from the right channel, right center channel, center channel, left center channel and the surround right channel, said decoding method comprising the steps of multiplying each of the pre-set number of channels with a pre-set constant number times signals of a necessary minimum number of channels, and summing the resulting channel signals multiplied with the preset constant numbers.

5. A decoding device for decoding audio signals in which, during reproduction from a recording medium having recorded thereon the audio signals encoded from eight channels to ten channels, said audio signals are down-converted to a pre-set number of channels not more than eight, said ten channels of the audio signals being a left channel, a right channel, a surround left channel, a surround right channel, a sub-woofer channel, a combined center channel combined from a center channel, a left center channel and a right center channel, a combined left channel combined from the left channel and the left center channel, a combined right channel combined from the right channel and the right center channel, a mixed left channel combined from the left channel, left center channel, center channel, right center channel and the surround left channel, and a mixed right channel combined from the right channel, right center channel, center channel, left center channel and the surround right channel, said decoding device comprising means for multiplying each of the pre-set number of channels with a pre-set constant number times signals of a necessary minimum number of channels, and means for summing the resulting channel signals multiplied with the preset constant numbers.

* * * * *